Feb. 19, 1946.    H. M. NEWMAN    2,395,191
FRAME OR MOUNT
Filed Dec. 29, 1943    2 Sheets-Sheet 1
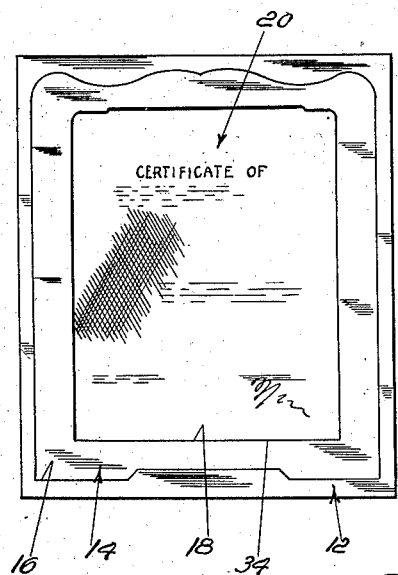
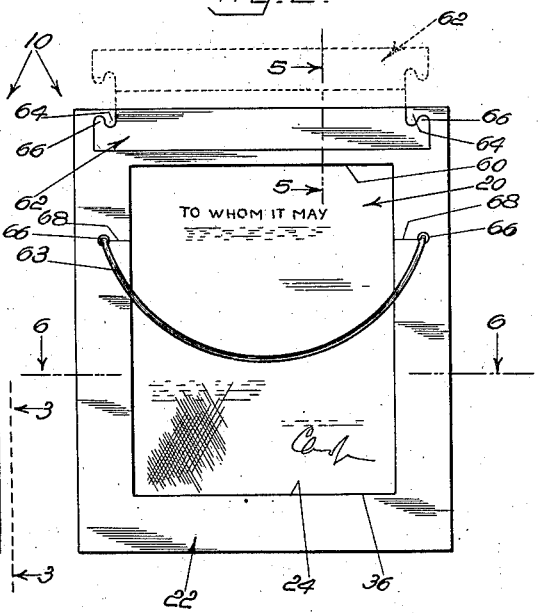
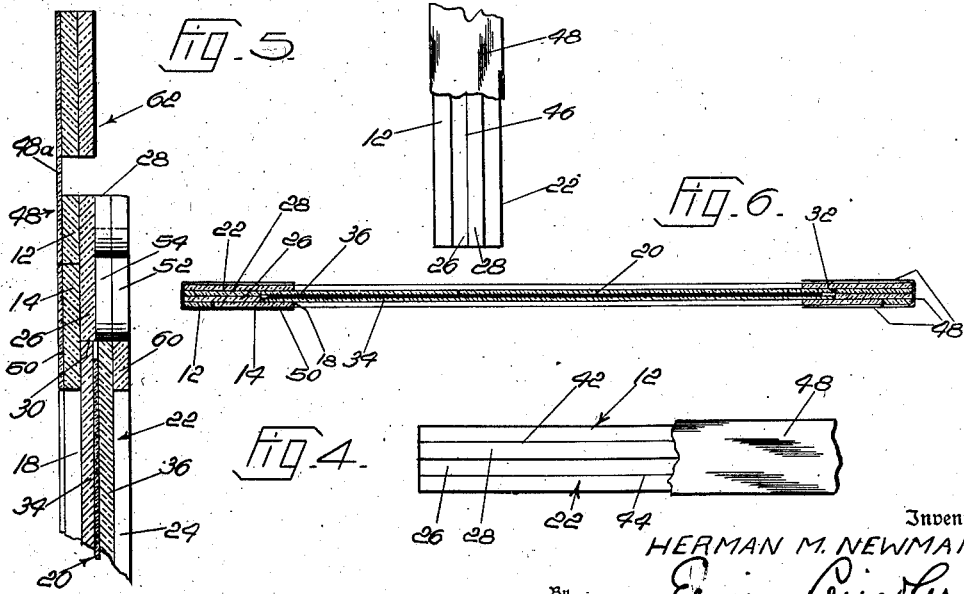
Inventor
HERMAN M. NEWMAN
By
Attorney Feb. 19, 1946.     H. M. NEWMAN     2,395,191
FRAME OR MOUNT
Filed Dec. 29, 1943     2 Sheets-Sheet 2
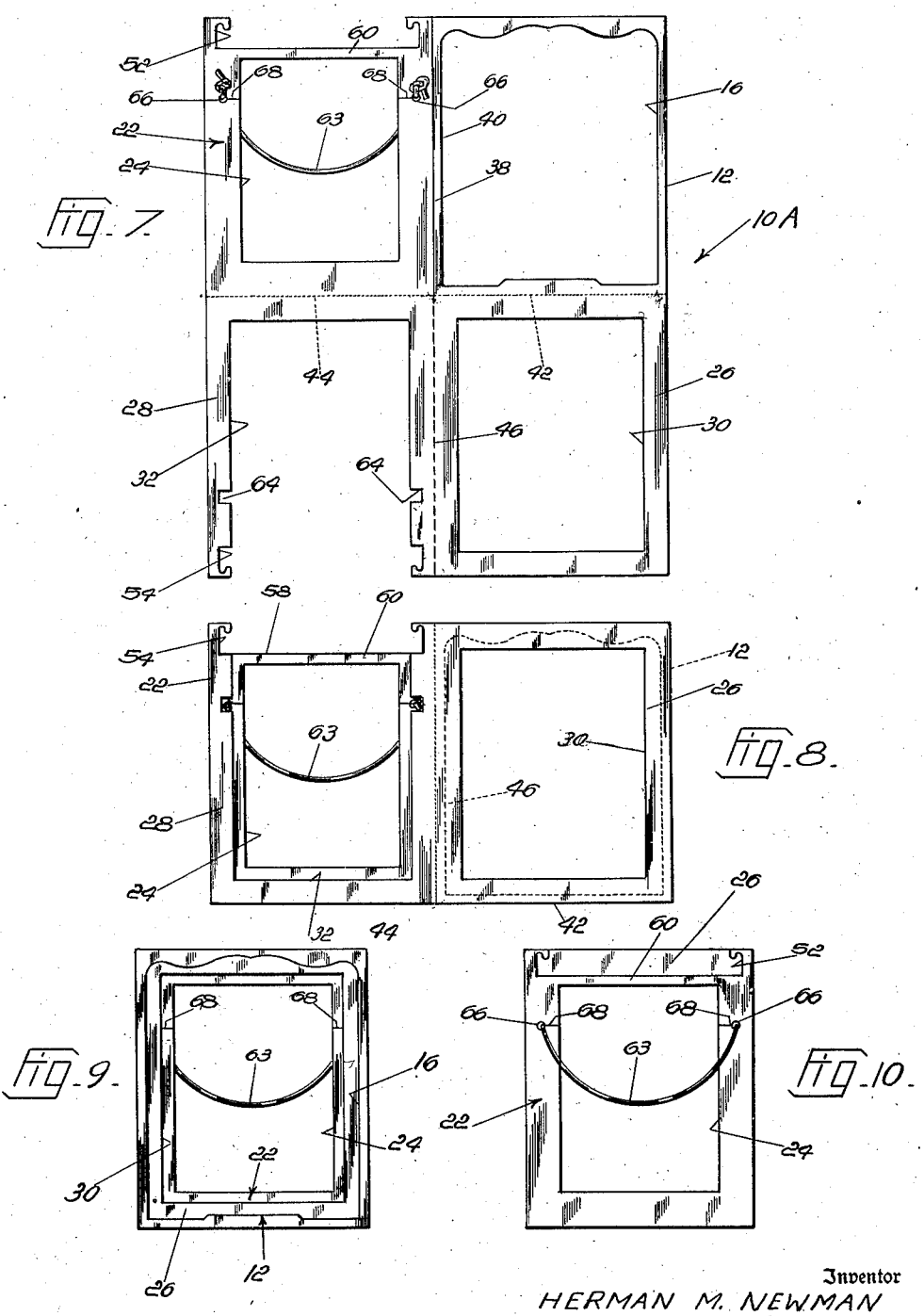
Inventor
HERMAN M. NEWMAN
By Edwin ⎯⎯⎯
Attorney Patented Feb. 19, 1946

2,395,191

UNITED STATES PATENT OFFICE 2,395,191

FRAME OR MOUNT

Herman M. Newman, Great Neck, N. Y.

Application December 29, 1943, Serial No. 516,027

7 Claims. (Cl. 40—154)

This invention relates to frames or mounts for pictures, diplomas, certificates, etc.

One object of the invention is to provide a frame or mount of such construction that it can be easily produced by simple manufacturing operations from cardboard or other inexpensive material, said frame or mounts being durable and of pleasing appearance as well as inexpensive.

Another object is to produce a frame or mount which, in effect, is a double frame or mount in unitary form in that it is provided with display windows or openings at both sides thereof.

A further object of the invention is to provide a frame or mount of such construction that it can be produced from a minimum number of parts.

The above and other objects, features and advantages of this invention will be fully understood from the following description with reference to the accompanying illustrative drawings.

In the drawings:

Figure 1 is a front view of a frame or mount embodying the present invention;

Figure 2 is a view of the back of said frame or mount and showing in dotted lines the open position of the closure member with which said frame or mount is provided;

Figure 3 is a view, on a larger scale, of part of one edge of the frame or mount as observed along the line 3—3 of Figure 1, a part of the edge binding being removed for the purpose of illustration;

Figure 4 is a view, on a larger scale, of a part of the bottom edge of the frame or mount, a part of the edge binding being removed for the purpose of illustration;

Figure 5 is a fragmentary sectional view, on a larger scale, on the line 5—5 of Figure 2;

Figure 6 is a horizontal sectional view, on a larger scale, on the line 6—6 of Figure 2;

Figure 7 is a plan view of a fabricated blank from which the frame or mount is made;

Figure 8 is a view of the fabricated blank partly folded; and

Figures 9 and 10 are front and back views, respectively, of the frame or mount in its partially completed condition.

Referring now to the drawings in detail, the frame or mount 10 embodying the present invention comprises a front member having a part 12 and an inlay part 14 which is fitted in an opening 16 in said part 12 and which is provided with a window opening 18 through which the display element, here shown as a certificate 20, is visible. Also as here shown, the backing member 22 of the frame is provided with an opening 24 through which the back of the certificate 20 or the front of another display element mounted in the frame is visible. The frame comprises also an intermediate member having the parts 26 and 28 provided with openings 30 and 32 in which the display element or elements and glass or other transparent covers 34 and 36 are mounted. It will be noted by reference to Figure 6 that the front member and more specifically, the inlay part 14 thereof extends laterally inwardly beyond the edges of openings 30 and 32 of the parts 26 and 28 of the intermediate member and that similarly the backing member 22 extends laterally inwardly of said last mentioned openings whereby said front and backing members overlie marginal edge portions of the display element or elements and the transparent covers 34 and 36 which are positioned in the openings 30 and 32 of the intermediate member. The construction of the front member part 12, the backing member 22 and the intermediate member parts 26 and 28 will now be more particularly described.

In accordance with the preferred embodiment of the present invention, backing member 22, front member part 12, and intermediate member parts 26 and 28 are preferably formed in one piece from a blank of suitable material, preferably foldable material, for example, cardboard. As illustrated in Figure 7, the cardboard blank 10A is die-cut or otherwise suitably fabricated to provide the openings 16, 24, 30 and 32, is further cut along the line 38 to form one side edge 40 of front member 12, and is scored along the lines 42, 44 and 46 which provide the similarly numbered fold lines between parts of the frame, namely, the fold line 42 between the front member part 12 and the intermediate member part 26, the fold line 44 between the back part 22 and the intermediate member part 28, both of said fold lines 42 and 44 being at the bottom of the frame (Figure 4), and the fold line 46 between the backing member 22 and the posterior intermediate frame member part 28 at one side edge of the frame (Figure 3).

By reference to Figures 7, 8 and 9, it will be observed that the cut and scored blank 10A illustrated in Figure 7 is foldable first about the fold lines 42 and 44 to position the parts as illustrated in Figure 8 and then about the fold line 46 to position the parts as illustrated in Figure 9. The frame members and parts thereof are secured in this folded relation by an edge binding strip 48 formed of paper or in any any other suitable material and adhesively secured to the front of frame member part 12, the back of backing member 22 and to the edges of all of said frame member parts, thus also to provide the frame with a finished or ornamental appearance. The front inlay part 14 is also preferably formed of cardboard or other suitable sheet material and is covered with paper or other suitable surface-finishing material 50 which preferably contrasts with edging material 48 in color or in shade of color. Front inlay part 14 preferably lies in the plane of front member part 12 and if desired may be either thicker or thinner than front member part 12 so as to either project somewhat beyond the front surface of the latter or to be disposed inwardly of said front surface. As here shown, the front surface of inlay part 14 is flush with the front surface of frame member part 12. Inlay part 14 is adhesively secured to the adjacent surface of intermediate member part 26 and is also preferably adhesively secured to the adjacent surface of transparent cover 34.

Provision is made in the frame or mount 10 to facilitate the insertion or removal of the display element or elements. For this purpose, end portions of backing member 22 and of one of the intermediate frame parts, namely part 28, are removed as illustrated in Figure 7 to provide the end cut outs 52 and 54 in said parts 22 and 28, respectively. Preferably, before the blank is cut to form said cut outs 52 and 54, the end portions of parts 22 and 28 are adhesively secured to each other for the full widths of said parts and for the full depth of part 28 between the top edge thereof and the opening 32, this leaves backing member 22 with an integral part 60 at the upper edge of the opening 24 therein. The parts removed from backing member 22 and part 28 of the intermediate member of the frame and which are adhesively secured to each other, are utilized for forming the closure member 62 (Figures 2 and 5) which removably fits into the cut-out formed at the back of the frame by said cut outs 52 and 54 for closing and opening said cut out. It will be observed by reference to Figure 5 that closure member 62 is hingedly connected to the frame by a portion 48a of the edge binding strip 48. When closure member 62 is positioned in the cut out at the back of the frame, its inner surface is substantially flush with the adjacent surface of the intermediate frame member part 26 and its outer surface is substantially flush with the outer surface of backing member 22. Normally, the frictional engagement of the edges of closure member 62 with the edges of parts of the frame at the cut out portion 52 and 54 is sufficient to retain said closure member 62 releasably in closed position, and this holding engagement is augmented by transversely interengaging portions 64 and 66 in the closure member and frame, respectively, at both ends of said closure member. It will be observed by reference to Figure 5 that the cut out in the back of the frame is open at the top edge of the frame to permit the insertion and the removal of the display element and also of the transparent cover 36 when the cover member 62 is retracted from the cut out at the back of the frame.

The frame 10 is provided with a cord 63 for suspending the frame. The ends of cord 63 are knotted and are positioned in recesses 64 formed in intermediate frame part 28 (Figure 7) which registers with apertures 66 in backing member 22. Slits 68 are formed in backing member 22 between companion apertures 66 and the edge of opening 24 so that the cord 63 can be attached to the frame after it is finished.

While I have shown and described the preferred embodiment of my invention, it will be understood that the latter may be embodied otherwise than as herein shown or described and that in the illustrated embodiment certain changes in the details of construction and the arrangement of parts may be made without departing from the underlying principles of this invention.

Having thus described my invention, what I claim as new and desire to secure by Letters Patent, is:

1. In a frame or mount, a front member having a window opening, a backing member, an intermediate member disposed between said front and backing members and having a side edge opening to receive a display element for view through said window opening, all of said members being formed in integral relation of foldable material and said intermediate member comprising two superposed layers integral with each other at adjacent side edges thereof along a fold line therebetween located at one side edge of the frame, said two layers of said intermediate member being integral with said front and back members, respectively, along separate fold lines therebetween, said last mentioned fold lines being located at one side edge of the frame at right angles to said first mentioned side edge, said side edge opening of the frame being in the side edge of the frame opposite said last mentioned side edge thereof, and means holding said front, intermediate and backing members in said folded relation.

2. In a frame or mount, a front member having a window opening, a backing member, an intermediate member disposed between said front and backing members and having an opening to receive a display element for view through said window opening, each of said members being formed of foldable material and said intermediate member comprising a plurality of superposed layers integral with each other and with the adjacent front and backing members, respectively, along lines of fold therebetween, said superposed layers of said intermediate layers being integral with each other at a fold line located at one outer side edge of the frame and extending at right angles to said first mentioned fold lines, said backing and the adjacent layer of said intermediate member having cut-outs in registry with each other, the cut-out of said layer of the intermediate member being continuous with said opening of said intermediate member whereby the display element is insertable in and removable from the frame through said cut-outs, and a closure member pivotally connected to said front member and movably fitted in said cut-outs for closing the same and pivotally movable out of said cut-outs for said insertion and removal of the display element.

3. In a frame or mount, a front member, a backing member, each of said members having a window opening, an intermediate member disposed between said front and backing members and having an opening to receive a display element for view through either of said window openings, said front and backing members having parts extending laterally inwardly of the peripheral edge of said opening in the intermediate member and forming marginal surfaces to overlie the adjacent marginal edge surface of the display element, and means holding said front, intermediate and backing members in said relation, said backing member having a cut-out near the edge thereof, said cut-out being open at one side thereof at said edge in the plane of the backing member and separated from said window of the backing member by a portion of the material of said backing member, said intermediate member having a cut-out continuous with the opening in said intermediate member and in registry with said cut-out of the backing member for the insertion in and removal from the frame of the display element, and a transparent cover insertable into the frame through said open-side of the cut-out to a position adjacent the window opening of said backing member at the inner surface thereof for covering said window of said backing member.

4. In a frame or mount, a front member, a backing member, each of said members having a window opening, an intermediate member disposed between said front and backing members and having an opening to receive a display element for view through either of said window openings, said front and backing members having parts extending laterally inwardly of the peripheral edge of said opening in the intermediate member and forming marginal surfaces to overlie the adjacent marginal edge surface of the display element, and means holding said front, intermediate and backing members in said relation, said backing member having a cut-out near the edge thereof, said cut-out being open at one side thereof at said edge in the plane of the backing member and separated from said window of the backing member by a portion of the material of said backing member, said intermediate member having a cut-out continuous with the opening in said intermediate member and in registry with said cut-out of the backing member for the insertion in and removal from the frame of the display element, a transparent cover insertable into the frame through said open-side of the cut-out to a position adjacent the window opening of said backing member at the inner surface thereof for covering said window of said backing member, and a closure member movably fitted in said cut-outs for closing the same and movable out of said cut-outs for said insertion and removal of the display element and the transparent cover.

5. In a frame or mount, a front member, a backing member, each of said members having a window opening, an intermediate member disposed between said front and backing members and having an opening to receive a display element for view through either of said window openings, said front and backing members having parts extending laterally inwardly of the peripheral edge of said opening in the intermediate member and forming marginal surfaces to overlie the adjacent marginal edge surface of the display element, and means holding said front, intermediate and backing members in said relation, said backing member having a cut-out near the edge thereof, said cut-out being open at one side thereof at said edge in the plane of the backing member and separated from said window of the backing member by a portion of the material of said backing member, said opening of the intermediate member being in communication with said cut-out for the insertion in and removal from the frame of the display element, and a transparent cover insertable into the frame through said open-side of the cut-out to a position adjacent the window opening of said backing member at the inner surface thereof for covering said window of said backing member.

6. In a frame or mount, a front member, a backing member, each of said members having a window opening, an intermediate member disposed between said front and backing members and having an opening to receive a display element for view through either of said window openings, said front and backing members having parts extending laterally inwardly of the peripheral edge of said opening in the intermediate member and forming marginal surfaces to overlie the adjacent marginal edge surface of the display element, and means holding said front, intermediate and backing member in said relation, said backing member having a cut-out near the edge thereof, said cut-out being open at one side thereof at said edge in the plane of the backing member and separated from said window of the backing member by a portion of the material of said backing member, said opening of the intermediate member being open at one side edge of the frame for the insertion in and removal from the frame of the display element, a transparent cover insertable into the frame through said open-side of the cut-out to a position adjacent the window opening of said backing member at the inner surface thereof for covering said window of said backing member, and a closure member movably fitted in said cut-out for closing the same and movable out of said cut out for said insertion and removal of the display element and said transparent cover.

7. The method of making a frame or mount for a display element, which comprises cutting a blank of cardboard along a line disposed between and parallel to two opposite side edges of the blank and extending from a third side edge of the blank to an end point spaced from a fourth side edge of the blank which is opposite said third side edge, scoring said blank for folding the same along a line parallel to said third edge, passing through said end point and extending between said two opposite side edges, scoring said blank for folding the same along a line parallel to said two opposite side edges and extending from said end point of said cutting line to said fourth side edge to form front, intermediate and backing members, united with each other along lines of fold at edges of the frame with said intermediate member comprising two layers united with each other along a line of fold, and forming an opening in each of said layers of said intermediate member and in said front member to provide the intermediate and front member with display-element receiving and viewing openings, respectively.

HERMAN M. NEWMAN.